United States Patent [19]

Beunk et al.

[11] Patent Number: 5,050,569
[45] Date of Patent: Sep. 24, 1991

[54] FUEL INJECTION SYSTEM FOR AN INTERNAL COMBUSTION ENGINE AND FUEL HEATING DEVICE THEREFOR

[75] Inventors: Gerrit J. Beunk; Frederik M. N. Van Den Elst, both of Almelo, Netherlands

[73] Assignee: Texas Instruments Incorporated, Dallas, Tex.

[21] Appl. No.: 455,487

[22] Filed: Dec. 22, 1989

[51] Int. Cl.$^5$ ............................................ F02M 31/00
[52] U.S. Cl. .................................... 123/549; 123/557; 392/479
[58] Field of Search .................. 123/557, 549, 546; 219/304, 305, 505, 299

[56] References Cited

U.S. PATENT DOCUMENTS

| | | | |
|---|---|---|---|
| 1,418,011 | 5/1922 | Mehn | 219/305 |
| 3,868,939 | 3/1975 | Friese et al. | |
| 3,968,346 | 7/1976 | Cooksley | 219/305 |
| 4,213,432 | 7/1980 | Levy | |
| 4,235,210 | 11/1980 | Sumiyoshi et al. | |
| 4,279,234 | 7/1981 | Marcoux et al. | |
| 4,365,746 | 12/1982 | Tanasawa et al. | |
| 4,406,785 | 9/1983 | Siefer | 123/557 |
| 4,447,065 | 5/1984 | Eder et al. | |
| 4,458,655 | 7/1984 | Oza | |
| 4,477,715 | 10/1984 | Bell et al. | 123/557 |
| 4,501,255 | 2/1985 | Van Der Ploeg et al. | |
| 4,508,957 | 4/1985 | Rocchitelli | 219/305 |
| 4,529,866 | 7/1985 | Leary | 123/557 |
| 4,633,069 | 12/1986 | Berg et al. | |
| 4,898,142 | 2/1990 | Van Wechen et al. | |

FOREIGN PATENT DOCUMENTS

| | | | |
|---|---|---|---|
| 2000670 | 1/1979 | United Kingdom | 219/305 |
| 2145153A | 3/1985 | United Kingdom | |

Primary Examiner—Andrew M. Dolinar
Assistant Examiner—M. Macy
Attorney, Agent, or Firm—James P. McAndrews; John A. Haug; Melvin Sharp

[57] ABSTRACT

A fuel injection system having an air supply and a fuel injection spray valve furnishing an air-fuel mixture to an internal combustion engine has a fuel heating device for heating the fuel just prior to spraying from the valve to enhance fuel-air mixing, the heater having a housing comprising a pair of stiffly compressible housing elements clamped in sealing relation to each other for capturing a flat ceramic heating device of positive temperature coefficient of resistivity between the compressible housing elements, the elements each having a central opening and a spiral groove therein cooperating to form a chamber holding the heating device and for guiding fuel through the grooves in heat-transfer relation to the disc along spiral paths extending along each flat side of the heating disc, the housing having terminals sealed therein for electrically engaging opposite sides of the heating disc.

12 Claims, 3 Drawing Sheets

FUEL INJECTION SYSTEM FOR AN INTERNAL COMBUSTION ENGINE AND FUEL HEATING DEVICE THEREFOR

BACKGROUND OF THE INVENTION

The field of the invention is that of fuel injection systems for internal combustion engines and relates more particularly to a fuel injection system having a heater for fuel sprayed from a fuel injection spray valve.

Fuel injection systems have many advantages over carburetion systems with respect to improving power and acceleration and the like in that sensors can regulate fuel injection spray valves to provide the correct amount of fuel in all circumstances and can react more quickly and accurately to changes in throttle position to provide better engine performance. However, fuel injection spray valves used in such systems tend to achieve relatively poor mixing of fuel and air because air velocity and volumes are limited and spraying action by the valves is also fairly limited in the fuel injection process. These factors can result in poor fuel economy, in fuel condensation in cylinder inlet passages and the like, and in excessive emission of hydrocarbon pollutants into the atmosphere. It would be desirable to improve fuel vaporization in such fuel injection systems by heating the fuel but fuel heating systems which have been proposed for that purpose have tended to be more expensive or less efficient than desired.

BRIEF SUMMARY OF THE INVENTION

It is an object of the invention to provide a novel and improved fuel injection system having improved means for heating fuel being furnished to the engine by the system; to provide an improved heater device for a fuel injection system; and to provide such a heater device which is compact, efficient and economical for heating fuel just prior to spraying of the fuel from a fuel injection spray valve nozzle.

Briefly described, the novel and improved fuel injection system of the invention comprises air supply means, a fuel injection spray including known or any new design types having a spray nozzle and having a regulatable spray mechanism cooperating with that nozzle for selectively directing a measured amount of fuel such as gasoline through the nozzle, fuel pump means for directing fuel to the spray valve under pressure, and a fuel heating device mounted adjacent to the nozzle for heating fuel just as it is furnished to the nozzle to be sprayed from the valve. The heating device is adapted to provide sufficient heat to the fuel to improve vaporization and mixing of the fuel sprayed from the nozzle, particularly during cold weather, while avoiding such heating of the fuel as might cause undesirable fuel vaporizing in the system prior to being sprayed from the valve nozzle.

In accordance with this invention, the fuel heating device comprises a housing having a pair of stiffly resilient, compressible housing elements clamped in sealing relation to each other to form a chamber therebetween. A flat disc of ceramic electrical resistance material of positive temperature coefficient of resistivity (PTC) or the like is captured or held in the chamber between the elements. The heating disc material is selected to generate heat and to increase in temperature and resistivity as electrical current is directed through the heating disc. Preferably the disc material is selected to display a sharp increase in resistivity as it is heated to a selected temperature to stabilize at a disc temperature which is safe for avoiding fuel ignition in the heating device and for avoiding excessive fuel vaporization in the heating device or in the spray valve before the fuel is sprayed from the valve.

Preferably one of the noted housing elements has a recess in one side, has an opening extending into the recess, and has a spiral groove in a bottom of the recess extending from the opening to a side wall of the recess. The second housing element fits snugly in the recess in the first element to form a sealed chamber between one side of the second element and the bottom of the noted recess. The second housing element has an opening in the element to extend into the noted chamber and has a corresponding spiral groove in said one side of the second housing element. The spiral groove portions of the elements press respective opposite flat sides of the heater disc and cooperate with the openings in the housing elements to define a fuel flow path of significant length in heat-transfer relation to the disc wherein the fuel is guided through spiral flow paths over opposite sides of the flat heating disc in economical and efficient manner.

Terminal means are mounted in the housing to electrically engage contacts on the opposite sides of the flat heating disc through the openings in the housing elements for electrically energizing the heating disc. Preferably the terminal means are sealed in the housing by being embedded within housing members. The heating device is preferably mounted on the fuel injection spray valve to receive yield under pressure from the fuel pump to pass such fuel through the heating device to be rapidly heated, and to pass the heated fuel to the fuel spray valve nozzle located closely adjacent to the heating device.

DESCRIPTION OF THE DRAWINGS

Other objects, advantages, and details of the novel and improved fuel injection system and heating device of this invention appear in the following detailed description of preferred embodiments of the invention, the detailed description referring to the drawing in which.

DESCRIPTION OF THE PREFERRED EMBODIMENTS

Figure 1:
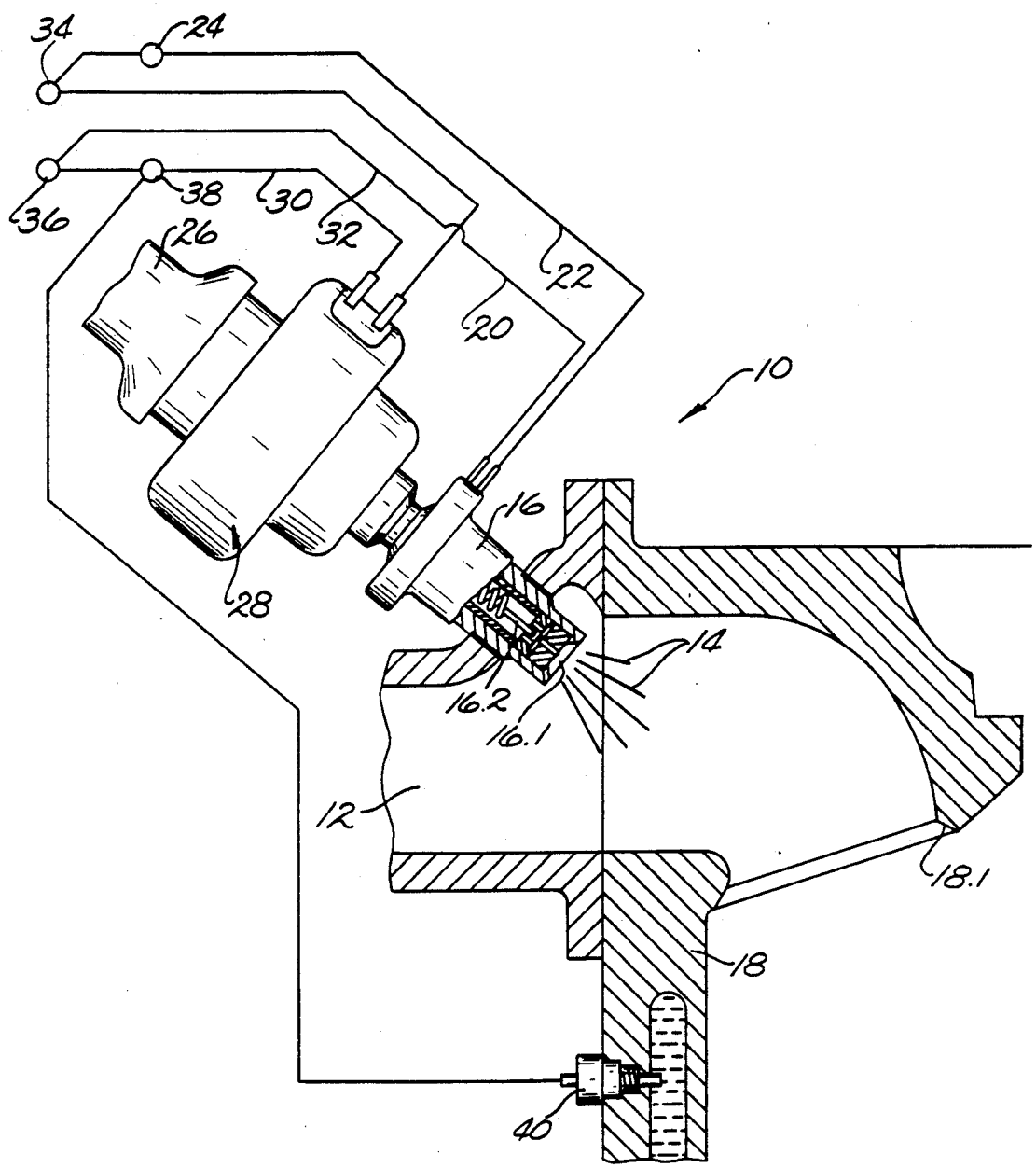
FIG. 1 is a partial side elevation view partially in section and partially schematic of the novel and improved and fuel injection system of the invention.

Referring to the drawings, 10 in FIG. 1 indicates the novel and improved fuel injection system of the invention which includes an air supply means represented schematically by the air inlet 12 of an intake manifold or the like arranged to receive gasoline or other fuel 14 from a fuel injection spray valve 16 to form an air-fuel mixture to be furnished to an engine cylinder 18 through a cylinder inlet 18.1, the inlet being adapted to receive a valve (not shown) as will be understood. The fuel injection spray valve 16 is of a type having a small nozzle 16.1 cooperating with an electrically operable spray mechanism indicated at 16.2. As will be understood, the spray valve mechanism is energized through leads 20 and 22 as regulated by a control computer 24 or the like for cooperating with the nozzle 16.1 to selectively direct and spray a measured amount of fuel through the nozzle to be atomized or vaporized and mixed with air drawn in through the inlet 12 to form the desired air-fuel mixture. A fuel pump means of conventional type schematically illustrated in FIG. 1 by the fuel inlet pipe 26 furnishes fuel to the spray valve under pressure, and a fuel injection heating device 28 receives fuel from the fuel pump means 26 to rapidly heat the fuel as it is furnished to the spray valve. The heating device is electrically energized through cables 30, 32 from an automobile power supply indicated by the line terminals 34, 36 or the like. Preferably a relay 38 is regulated by a thermostat 40 responsive to engine coolant temperature or the like as schematically illustrated in FIG. 1 to permit operation of the fuel injection heating device 28 at selected times such as under cold engine conditions or the like. In that arrangement, the fuel injection system furnishes the proper amount of fuel to the engine cylinder 18 in all operating conditions of the engine, and the fuel injection heating device heats the fuel when required to assure satisfactory fuel vaporizing as the air-fuel mixture is formed, thereby to avoid fuel condensation in the cylinder inlet e.g. and to avoid excessive pollution during engine operation.

Figure 2:
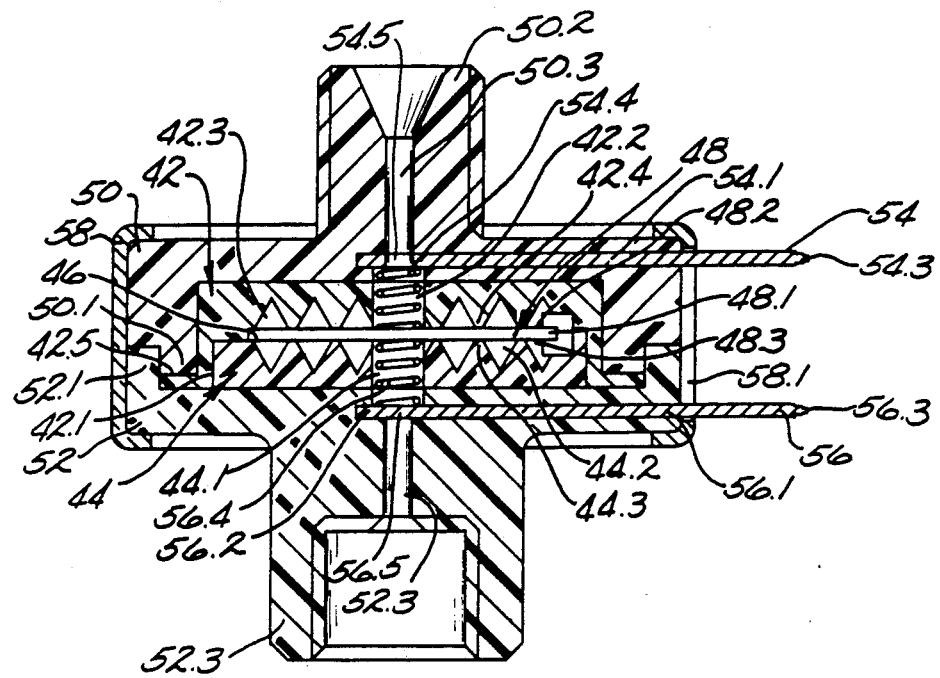
FIG. 2 is a section view to enlarged scale along an axis of FIG. 1 illustrating the novel and improved fuel injection heating device of the invention.
Figure 3:
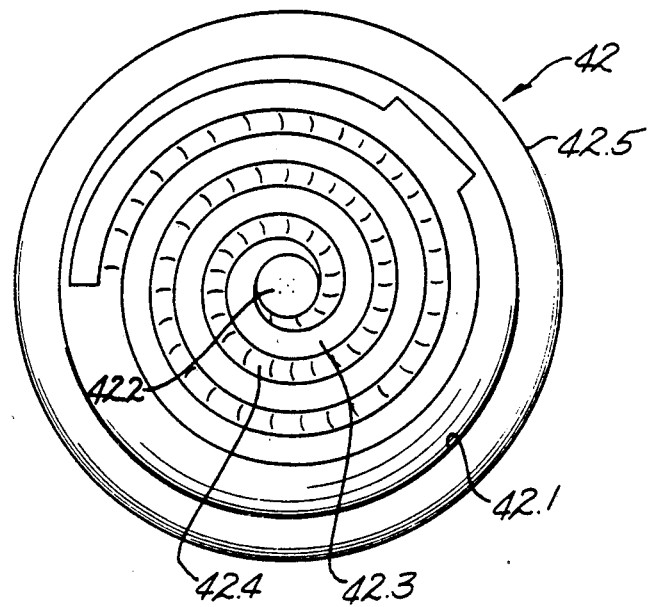
FIGS. 3 and 4 are section views along line 3-3 and 4-4 of FIG. 2 illustrating housing elements of the heating device of FIG. 2.
Figure 4:
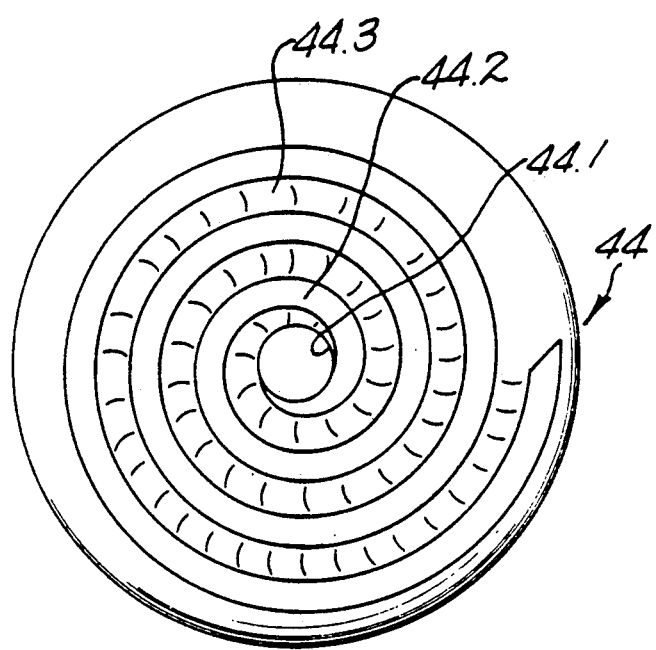

In accordance with this invention, the heating device 28 as shown in FIG. 2 comprises a housing having a pair of housing elements 42, 44 of a stiffly resilient, compressible material such as rubber or plastic. As will be understood, such elements are formed of materials selected to be compatible with exposure to fuel such as gasoline. The housing elements are clamped together in sealing relation to each other to form a sealed chamber 46 between the elements, and an electrical resistance heating disc 48 is captured or held within the chamber between the elements. Preferably the housing element 42 has a recess 42.1 in one side, has a central opening 42.2 in the bottom of the recess, and has a spiral groove 42.3 in the recess bottom. The housing elements 44 fits tightly into the recess 42.1 in sealing relation to the element 42, has a central opening 44.1 extending into the chamber 46, and has a spiral groove 44.2 in one side of the element corresponding to and facing the spiral groove 42.3 in the chamber. See FIGS. 3 and 4. Each housing element has tapered lands 42.4, 44.3 between convolutions of the spiral grooves, and the tips of the lands, which are preferably of small radius or somewhat pointed as shown, are disposed in a common plane. The small radius land tips provide improved sealing to the heating disc surface and expose more of the disc surface for heat-transfer purposes. Each element groove communicates at one end with the opening in the housing element and the opposite ends of the grooves are disposed at a periphery of the chamber 46 to be in communication with each other around an edge of the heating disc. Preferably the housing element 42 has an integral gasket flange portion 42.5 extending around the recess 42.1.

The heating disc 48 preferably comprises a body 48.1 of a ceramic material or the like having a positive temperature coefficient of resistivity and has metallizations or the like forming electrical contacts on opposite sides of the body as at 48.2, 48.3. The material of the heating disc is selected so it self-heats when electrical current is directed through the disc body and increases in resistance as it is heated until, at a selected temperature, the material displays a sharp increase in resistivity for substantially stabilizing at a disc temperature which is safe for preventing fuel ignition or excessive fuel vaporizing as discussed below. Preferably the heating disc is formed of a doped barium titanate material or the like having a stabilizing temperature on the order of about 80° C. to 120° C.

The heating disc 48 is disposed in the chamber 46 so that the tips of the lands 42.4, 44.3, between the spiral groove convolutions on the housing elements are pressed in sealing engagement to respective opposite sides of the heating disc itself to cooperate with the openings in the housing elements to define a fuel flow path through the chamber 46 which passes the fuel in close-heat transfer relation to the heating disc in an economical and efficient manner. That is, the housing elements press against the heating disc to define a fuel flow path of significant length which extends from the central opening 42.2 along a spiral path through the groove 42.3 over one disc side 48.2, over an edge 48.4 of the disc, along a spiral path through the groove 44.2 over the other side of the disc 48.3 to the central opening 44.1 in the other housing element. The spiral fluid flow path is typically triangular in cross section as shown but could be of variable cross section or could have baffles or other barriers 42.6 or the like as indicated in broken lines in FIG. 3 in the groove to add turbulence to fluid flow through the path for better heat-transfer. A pair of housing members 50, 52 of a relatively rigid electrical insulating material such as a plastic or ceramic material or the like, are proportioned to fit over, and preferably to substantially enclose, the compressible housing elements. Preferably the housing members have interfitting portions 50.1, 52.1 for receiving the gasket flange portion 42.5 in sealing relation therebetween. Preferably as shown the housing member 50 has a recess receiving the housing element 42, that housing element having its own recess 42.1 receiving the other element 44 as noted above. The housing members have reduced diameter portions 50.2, 52.2 each with a central bore 50.3, 52.3 aligned with a respective opening in a housing element, for mating with the fuel pump means 26 and with the fuel injection spray valve 16. The housing members are cemented, screwed, clamped or otherwise secured in sealing relation to the pump means and to the spray valve in any conventional manner. A housing sleeve 58 of a metal material or the like is fitted over the larger diameter portions of the housing members as shown in FIG. 2 and is swaged or otherwise formed around the members as indicated at 58.1 to hold the housing members and elements in assembled relation with the heating disc 48 so that the elements 42, 44 are sealed together, preferably being compressed for enhancing such sealing, and so that the housing members 50, 52 are sealed around the elements by the integral gasket flange portion 42.5. The holding action of the housing sleeve also serves to assure that the lands of the housing elements between convolutions of the spiral grooves therein are held in sealing relation to the flat sides of the heating disc.

The housing members 50, 52 mount respective terminal means 54, 56 preferably by having electrically conductive metal terminal blades 54.1, 56.1 and embedded in sealed relation within the housing member material so that first ends 54.2, 56.2 of the blades are disposed over the central openings 42.2, 44.1 in the respective housing elements and so that opposite ends 54.3, 56.3 extend from the heating device through an opening 58.2 in the housing sleeve. Preferably electrically conductive spiral metal spring means 54.4, 56.4 are positioned on, and preferably secured to, the first ends of the terminal means to extend through the central openings 42.2, 44.1 in the respective housing elements to electrically engage the contacts on the opposite sides of the heating disc 48. The terminal blades preferably have apertures 54.5, 56.5 aligned with the bores 50.3, 52.3 in the housing members as shown in FIG. 2.

The materials of the housing elements 42, 44 are selected to have low thermal conductivity and low thermal mass compared to the terminal means or housing sleeve e.g. All of the components of the heating device 28 are also small and compact so the heating device as a whole has small thermal mass as compared to the thermal mass of the liquid fuel accommodated in the heating device or fuel spray valve. Each of the heating device components is of rugged construction and is adapted by their compactness to be accommodated on the fuel spray valve closely adjacent to the location where the fuel is sprayed from valve nozzle. In that arrangement, when the heating device and spray valve are operated, the fuel heated in the device is adapted to be furnished and sprayed from the valve promptly after it is heated. Although the heating disc 48 is close to the spray valve nozzle, the fuel is passed along a relatively long path over the heating disc in close heat-transfer relation to the disc to be very efficiently heated. The thermal mass of the heating device is not large as compared to the thermal requirement for heating the fuel in the valve so the heating device is very promptly responsive to energization of the heating disc to transfer heat to the fuel or not as desired and is able to transfer substantial amounts of heat to the fuel when required just before it is sprayed to greatly enhance vaporizing and mixing of the fuel with air just as it is fed to the engine cylinder. The heating device is self-regulating to operate at a safe temperature to avoid fuel ignition and to avoid bubble formation or the like in the heating device or in the spray valve such as might interfere with accurate fuel supply by the valve.

It should be understood that although the heating device 28 is proposed for fuel heating it could also be used for other fluid heating within the scope of the invention.

It should be understood that although particular embodiments of the fuel injection system and heating device of this invention have been described by way of illustration, this invention includes all modifications and equivalents of the disclosed system and device falling with the scope of the appended claims.

We claim:

1. A fuel injection system having air supply means, a fuel injection spray valve for selectively spraying fuel to mix with air from the air supply means, fuel pump means furnishing fuel to the fuel injection spray valve under pressure, and a fuel heating device for heating the fuel furnished to the fuel injection spray valve to improve vaporizing of the fuel for enhancing mixing of the fuel and air, the fuel heating device comprising a heating disc of electrical resistance material, means for directing electrical current through the heating disc for generating heat, and housing means secured in sealing relation to the heating disc for defining fuel flow path along at least one side of the heating disc to pass the fuel in heat-transfer relation to the heating disc for heating the fuel, the heating disc comprising a flat disc of ceramic material of positive temperature coefficient of resistivity with both sides metallized, and the housing means comprising a pair of housing elements of stiffly resilient, compressible material secured together for forming a chamber therebetween accommodating the heating disc therein, the housing elements having a pair of openings extending into the chamber and having at least one spiral groove therein pressed against a flat side of the heating disc for defining a spiral fuel flow path over said flat disc side.

2. A fuel injection system according to claim 1 wherein each housing element has an opening therein, has a spiral groove therein, and has one end of its spiral groove communicating with the opening in said element, the opposite ends of the spiral grooves in the elements being disposed at a periphery of the chamber to communicate with each other over an edge of the heating disc.

3. A fuel injection system according to claim 2 wherein at least one housing element has a recess in one side thereof, has said opening therein centrally disposed in a bottom of the recess, and has the spiral groove therein extending from the opening to a periphery of the recess, said heating disc being disposed in said recess.

4. A fuel injection system according to claim 3 wherein the other housing element has a central opening therein and has the spiral groove therein extending from the said opening to a periphery of the element along a flat side of the element, said other element being disposed in the recess in said first housing element with said one element side facing into the chamber, said heating disc being disposed in said recess between said grooves.

5. A fuel injection system according to claim 4 wherein at least one housing element has tapered lands disposed between convolutions of the spiral grooves therein and has distal ends of the tapered lands pressed in sealing engagement with a flat side of the heating disc for defining said spiral fuel flow path over the heating disc side.

6. A fuel injection system according to claim 5 having a pair of relatively more rigid housing members disposed in surrounding relation to the pair of housing elements, the housing members having bores communicating with said openings in respective housing elements, and having means clamping the housing members in assembled relation to the housing elements for compressing the housing elements in said sealing relation and engagement with each other and with the heating disc.

7. A fuel injection system according to claim 6 wherein the means for directing electrical current through the heating disc comprises a pair of terminal blade means mounted on the housing members, said housing members being formed of electrically insulating material and having said blade means embedded in sealing relation therein to electrically connect to the disc and to extend from said chamber to a location exterior of the heating device.

8. A fuel injection system according to claim 7 wherein the terminal blade mean each comprise a terminal blade embedded in a housing member to extend into the bore in the respective housing member, and an electrically conductive spring means disposed in said bore and in a housing element opening aligned therewith for electrically connecting the blade with one side of said heating device through said bore and opening.

9. A fuel heating device for heating a fluid such as fuel comprising a heating disc of electrical resistance material, means for directing electrical current through the heating disc for generating heat, and a housing means secured in sealing relation to the heating disc for defining a spiral fluid flow path along at least one side of the heating disc to pass the fluid in heat-transfer relation to the heating disc for heating the fluid, the heating disc comprising a flat disc of ceramic material of positive temperature coefficient of resistivity with both sides metallized for heating fuel flowing in the flow path, and the housing means comprising a pair of housing elements of stiffly resilient compressible material secured together for forming a chamber therebetween accommodating the flat heating disc therein, the housing elements having a pair of openings extending into the chamber and at least one spiral groove formed herein facing into the chamber, the housing elements being compressed in sealing relation to each other and against opposite flat sides of the heating disc for defining a spiral fuel flow path over at least one flat heating disc side, each housing element having an opening therein, having a spiral groove therein, and having one end of its spiral groove communicating with the opening in that element, the opposite ends of the spiral grooves in the elements being disposed at a periphery of the chamber to communicate with each other over an edge of the heating disc, at least one housing element having a recess in one side thereof, having said opening therein centrally disposed in a bottom of the recess, and having the spiral groove therein extending from the opening to a periphery of the recess, said heating disc being disposed in said recess, the other housing element having a central opening therein and having the spiral groove therein extending from said opening to a periphery of the element along a flat side of the element, said other housing element being disposed in the recess in said first housing element with said one element side facing into the chamber, said heating disc in said recess being disposed between said grooves, at least one housing element having tapered lands disposed between convolutions of the spiral grooves therein and having distal ends of the tapered lands pressed in sealing engagement with a flat side of the heating disc for defining said spiral fuel flow paths over the heating disc side.

10. A fuel heating device according to claim 9 having a pair of relatively more rigid housing members disposed in surrounding relation to the pair of housing elements, the housing members having bores communicating with said openings in respective housing elements, and having means clamping the housing members in assembled relation to the housing elements for compressing the housing elements in said sealing relation and engagement with each other and with the heating disc.

11. A fuel heating device according to claim 10 wherein the means for directing electrical current through the heating disc comprises a pair of terminal blade means mounted on the housing members, said housing members being formed of electrically insulating material and showing said blade means embedded in sealing relation therein to electrically connect to the disc and to extend from said chamber to a location exterior of the heating device.

12. A fuel heating device according to claim 11 wherein the terminal blade means each comprise a terminal blade embedded in a housing member to extend into the bore in the respective housing member, and an electrically conductive spring means disposed in said bore and in a housing element opening aligned therewith for electrically connecting the blade with one side of said heating device through said bore and opening.

* * * * *